US006757300B1

(12) United States Patent
Pages et al.

(10) Patent No.: US 6,757,300 B1
(45) Date of Patent: Jun. 29, 2004

(54) TRAFFIC VERIFICATION SYSTEM

(75) Inventors: Jeffrey L Pages, Umina Beach (AU); Glen F English, Neutral Bay (AU)

(73) Assignee: Innes Corporation PTY LTD, Cremorne (AU)

( * ) Notice: Subject to any disclaimer, the term of this patent is extended or adjusted under 35 U.S.C. 154(b) by 0 days.

(21) Appl. No.: 09/326,414

(22) Filed: Jun. 4, 1999

(30) Foreign Application Priority Data

Jun. 4, 1998 (AU) ............................................ PP 3924

(51) Int. Cl.[7] .............................. H04J 1/14; H04B 1/69
(52) U.S. Cl. ...................................................... 370/493
(58) Field of Search ................................ 370/493, 494, 370/495; 765/58; 713/161

(56) References Cited

U.S. PATENT DOCUMENTS 3,004,104 A 10/1961 Hembrooke
3,586,781 A 6/1971 Jones
3,845,391 A 10/1974 Crosby
4,395,600 A * 7/1983 Lundy et al. ................ 179/1.5
4,703,476 A 10/1987 Howard
4,931,871 A 6/1990 Kramer
5,025,443 A * 6/1991 Gupta
5,185,762 A * 2/1993 Schilling .................... 375/130
5,319,735 A 6/1994 Preuss et al.
5,355,161 A 10/1994 Bird et al.
5,410,541 A * 4/1995 Hotto
5,450,490 A 9/1995 Jensen et al.
5,574,962 A 11/1996 Fardeau et al.
5,719,937 A 2/1998 Warren et al.
5,774,452 A 6/1998 Wolosewicz
5,822,360 A 10/1998 Lee et al.
5,826,227 A 10/1998 Jayant
5,937,000 A * 8/1999 Lee et al.
6,154,484 A * 11/2000 Lee et al.

FOREIGN PATENT DOCUMENTS

AU 668888 5/1993
AU 678806 6/1994
WO WO 98/53565 11/1998

* cited by examiner

*Primary Examiner*—Kenneth Vanderpuye
(74) *Attorney, Agent, or Firm*—Sacco & Associates, PA

(57) ABSTRACT

Disclosed is a method and apparatus for inserting a data signal into an audio signal to provide a tagged signal. The method includes removing a band of frequencies centred at a predetermined notch frequency from the audio signal, spectrally shaping the data signal so that it takes on the precise shape and magnitude of the envelope of the audio signal at the removed band, and inserting the shaped data signal into the removed band of the audio signal.

The method may be used to identify an audio segment or it may be used to encode the audio signal with other desired data. The method of the invention provides for the data signal to be virtually inaudible to the listener of the audio segment yet robust enough to survive severe audio signal processing.

38 Claims, 5 Drawing Sheets

TRAFFIC VERIFICATION SYSTEM

GENERAL FIELD OF THE INVENTION

This invention relates to the automatic identification of audio signals, particularly broadcast audio signals.

BACKGROUND OF THE INVENTION

It is often desirable to be able to produce a log of what audio signals are broadcast and when they are broadcast. This information is particularly useful to companies who pay for commercials advertising their goods or services. Using this information, a company is able to monitor how often and at what time their commercials are broadcast within a given period of time. They can thus monitor the broadcasts to ensure that they are getting what they pay for.

It will be appreciated that the term "audio signal" encompasses both analog and digital signals.

It is also useful to have a record of the times particular audio cuts were broadcast for legal purposes. For example, if a particular audio cut is being used as evidence in a court, an accurate time of broadcast may be obtained.

Owners of copyright in audio cuts would also be keen to have a record of when and how often their song, for example, is broadcast, for the purposes of collecting royalties.

Methods already exist to keep logs of broadcast patterns. One such method is a purely manual one in which one or several human operators physically monitor all broadcasts by watching a television set or listening to a radio. One television set and one radio must be monitored for each broadcast frequency. This is a labour-intensive and often inaccurate method of logging broadcasts.

Automatic methods do exist, however, these have their own disadvantages. Some of these methods tag a piece of audio in some way with identifying data, however, this data sometimes interferes with the audio signal, or is detectable as an audible signal over the top of the original audio signal. For many broadcast situations, this is an unsatisfactory outcome. Furthermore, audio signals often undergo heavy audio processing during the journey from transmitter to receiver. Often the signal is passed through a sub-band coded link (e.g. MPEG satellite ), and/or multi-band limiting. In many cases, the identification data signal imposed on the audio signal is unable to survive this processing and cannot be effectively detected and/or retrieved upon reception.

It is therefore an object of the invention to provide an improved means and method of automatically identifying an audio signal, in which the identifier is more reliable and robust than prior methods, but which does not substantially interfere with perceived audio quality.

SUMMARY OF THE INVENTION

In a broad form of the present invention, there is provided a method which includes:

A. removing a band of frequencies centred at a predetermined notch frequency from said audio signal;

B. spectrally shaping said data signal such that it takes on the precise shape and magnitude of the envelope of the audio signal at said removed band of frequencies centred at said notch frequency; and C. inserting said shaped data signal into said audio signal within the removed band centred at said notch frequency.

The data signal will preferably include a carrier signal modulated to enclose data using minimum shift frequency shift keying (MSK). Preferably, the notch frequency will be at approximately 3 kHz. The data signal will, in a preferred embodiment, be present over substantially the entire timespan of the audio segment comprising the audio signal. The data may include two six-digit numbers presented in binary form as a 40-bit field and will preferably represent an identification tag.

According to a second aspect of the invention, there is provided a method of detecting a data signal inserted into an audio signal according to the first aspect, the method including:

A. receiving said tagged signal at a receiving station;

B. band pass filtering said received signal to extract said inserted modulated data signal; and C. removing the amplitude modulation resulting from the spectral shaping from said modulated data signal.

According to a third aspect of the present invention, there is provided a method of identifying a transmitted audio signal, the method including the steps of:

A. removing a band of frequencies centred at a predetermined notch frequency from said audio signal;

B. spectrally shaping an identification signal identifying a particular audio segment such that it takes on the precise shape and magnitude of the envelope of the audio signal at said removed band of frequencies centred at said notch frequency;

C. inserting said identification signal into said audio signal to produce a tagged signal;

D. transmitting said tagged signal;

E. receiving said transmitted tagged signal;

F. bandpass filtering said received tagged signal to extract said identification signal;

G. removing the amplitude modulation resulting from the spectral shaping from said extracted identification signal; and H. reading and/or recording said identification signal to identify said tagged signal.

According to a fourth aspect of the present invention, there is provided an encoder for encoding a data signal onto an audio signal, the encoder including:

filter means for removing a band of frequencies centred at a predetermined notch frequency from said audio signal;

shaping means for spectrally shaping said data signal such that it takes on the precise shape and magnitude of the envelope of the audio signal at said removed band of frequencies;

inserting means for inserting said shaped data signal into said audio signal within the removed frequency band centred at said notch frequency; and data input means for receiving data to be encoded into said audio signal.

According to a fifth aspect of the invention, there is provided a decoder for decoding an encoded audio signal encoded by the encoder of the invention, the decoder including:

a receiver input for receiving said encoded audio signal;

receiver filter means for extracting a band of frequencies containing said code from said encoded audio signal;

means for removing the envelope modulation applied to said data signal; and receiver demodulation means for demodulating said data signal.

The present invention thereby provides a method and apparatus for inserting and detecting a data signal into an audio signal such that the data signal is virtually inaudible by a listener of the audio signal, yet is robust enough to survive severe audio processing.

This is accomplished by inserting the data signal into a notch created in the audio signal, and spectrally shaping the inserted data signal to conform precisely to the envelope of the audio signal at the frequency band at which the data signal is inserted.

BRIEF DESCRIPTION OF THE DRAWINGS

The invention will now be described with reference to the following drawings in which.

DETAILED DESCRIPTION OF THE INVENTION

Figure 1:
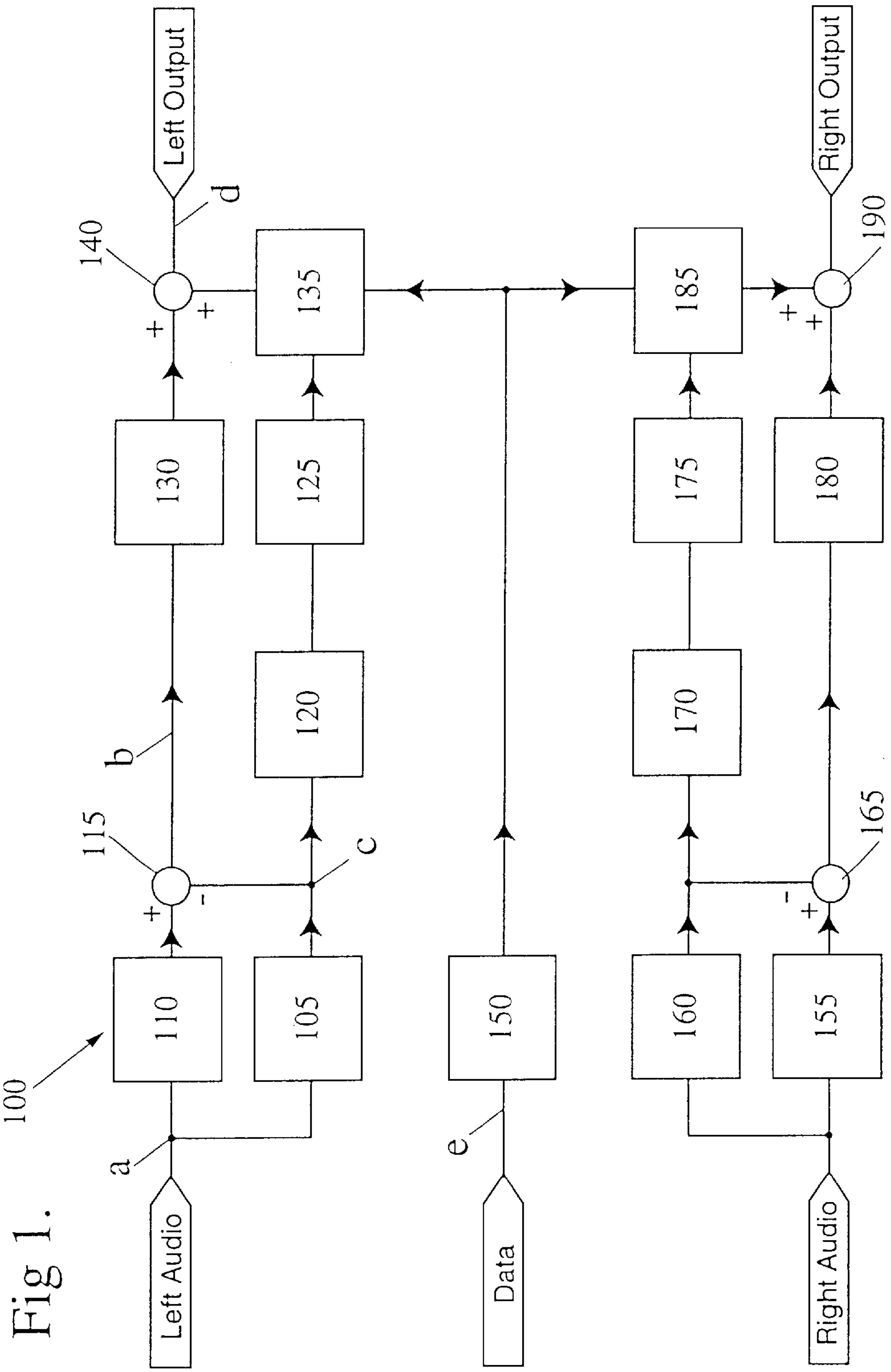
FIG. 1 is a block diagram of the encoder used in the tagging stage of the method of the present invention.

In a preferred embodiment of the invention, the method consists of encoding an audio signal with an identification data signal by the use of encoder 100 as shown in FIG. 1.

Figure 2A:
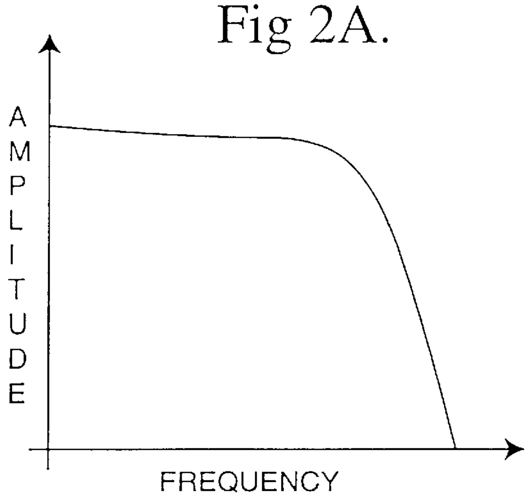
FIGS. 2A–2D show spectral diagrams of signals at various points in the encoder of FIG. 1.

Stereo audio input is sampled at 48 kHz and the left and right channels separately processed as shown in FIG. 1. The spectral diagram of the left audio signal appearing at point "a" is shown in FIG. 2A. The left channel is split into two signals, with one signal passing through bandpass filter 105 to provide a signal 400 Hz wide, centred at 3 kHz.

Figure 2B:
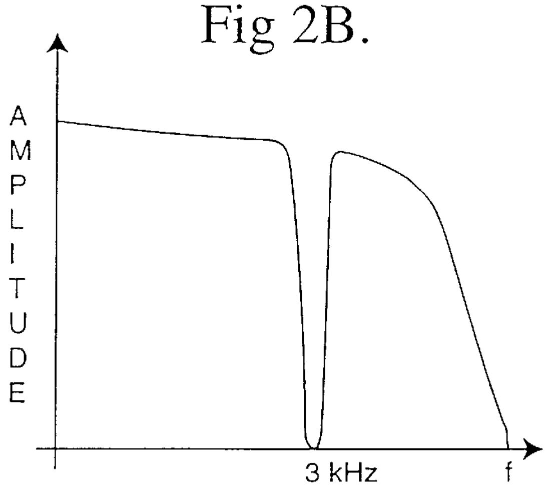
Figure 2C:
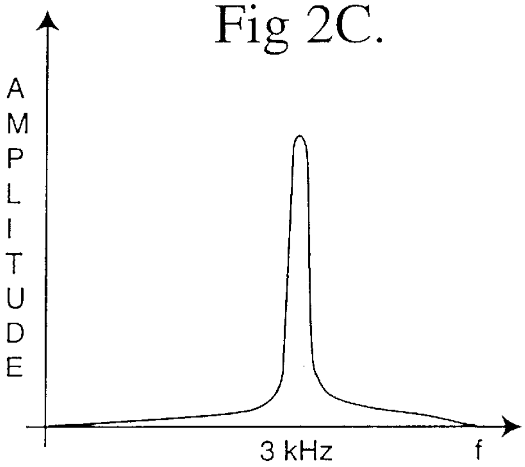

The output of bandpass filter 105 (at point "c") is represented by the spectral diagram shown in FIG. 2C. The other signal at point "a" is fed into delay line 110 which delays the signal to match the delay caused by bandpass filter 105. Both signals are then fed into element 115, the effect of which is to remove from the original left audio signal at point "a" the band of frequencies appearing at point "c". The output of element 115 (at point "b") is shown in FIG. 2B.

The signal at point "c" is also fed into envelope detector 120 which is a square law detector. The envelope information of the signal at point "c" is thereby extracted. After squaring, the signal consists of a base band component and another product centred at 6 kHz, each component being bandlimited to twice the filter bandwidth. This signal is then fed into element 125 where the 6 kHz centred component is removed by an FIR lowpass filter and the baseband signal is passed through a square root function to recover the envelope.

The signal at point "b" is further delayed by delay line 130 to match the delays to the signal at point "c" caused by elements 120 and 125.

An identification data signal (details of which are described more fully below) enters the system at point "e" and is modulated using minimum shift frequency shift keying (MSK) centred at 3 kHz by MSK generator 150. This MSK modulated identification signal is then input to modulator 135, which amplitude modulates the data signal in accordance with the signal at the output of element 125. This modulating signal is essentially the envelope information of the band of frequencies removed from the original left audio signal.

Figure 2D:
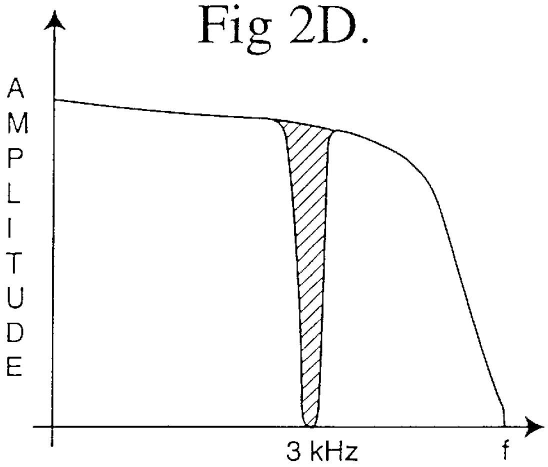

The amplitude modulated MSK data signal is then summed at summer 140 with the delayed output at point "b". The output of summer 140 (at point "d") is shown in FIG. 2D, and consists of the original audio input at point "a" with an identification data signal shaped to conform with the envelope of the audio signal and inserted in the notch centred at 3 kHz. This provides an audio signal with an identification tag that is robust enough to be retrievable at reception after going through heavy audio processing subsequent to its transmission. The data is also virtually inaudible to the listener.

The tagged audio signal is then broadcast in the normal manner, whether it be from a radio station or an audio signal for a television transmission.

The identification data signal ("tag") used above is derived in the following way. The identification tag consists of two 6-digit numbers. One of these numbers represents the location at which the recording was made, while the other number identifies the individual recording produced at the location.

Of course, in practice, these two numbers could represent any type of data, including an identification mark, a control signal, general information, or a combination of the above.

Figure 3:
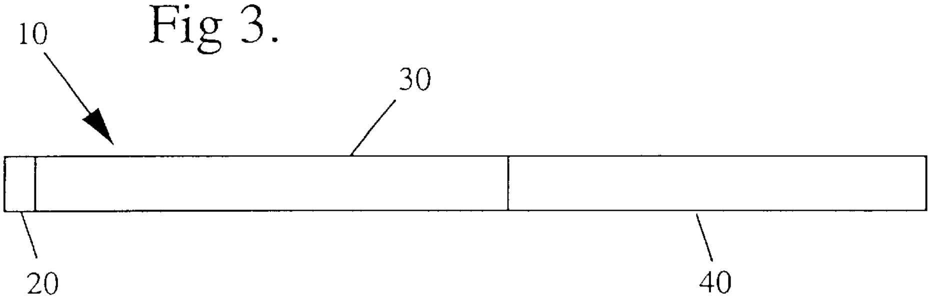
FIG. 3 shows a graphical representation of an identification data frame in a preferred form of the invention.

These two numbers are presented in binary form as a 40 bit field, to which is added a 32 bit cyclic redundancy check. An additional frame synchronisation pulse one bit period in length makes up a total frame size of 73 bits. This data frame 10 is shown in FIG. 3 where there is shown synchronising bit 20, identification bits 30 and CRC bits 40. This frame is transmitted repeatedly for the duration of the tagged audio.

Figure 4:
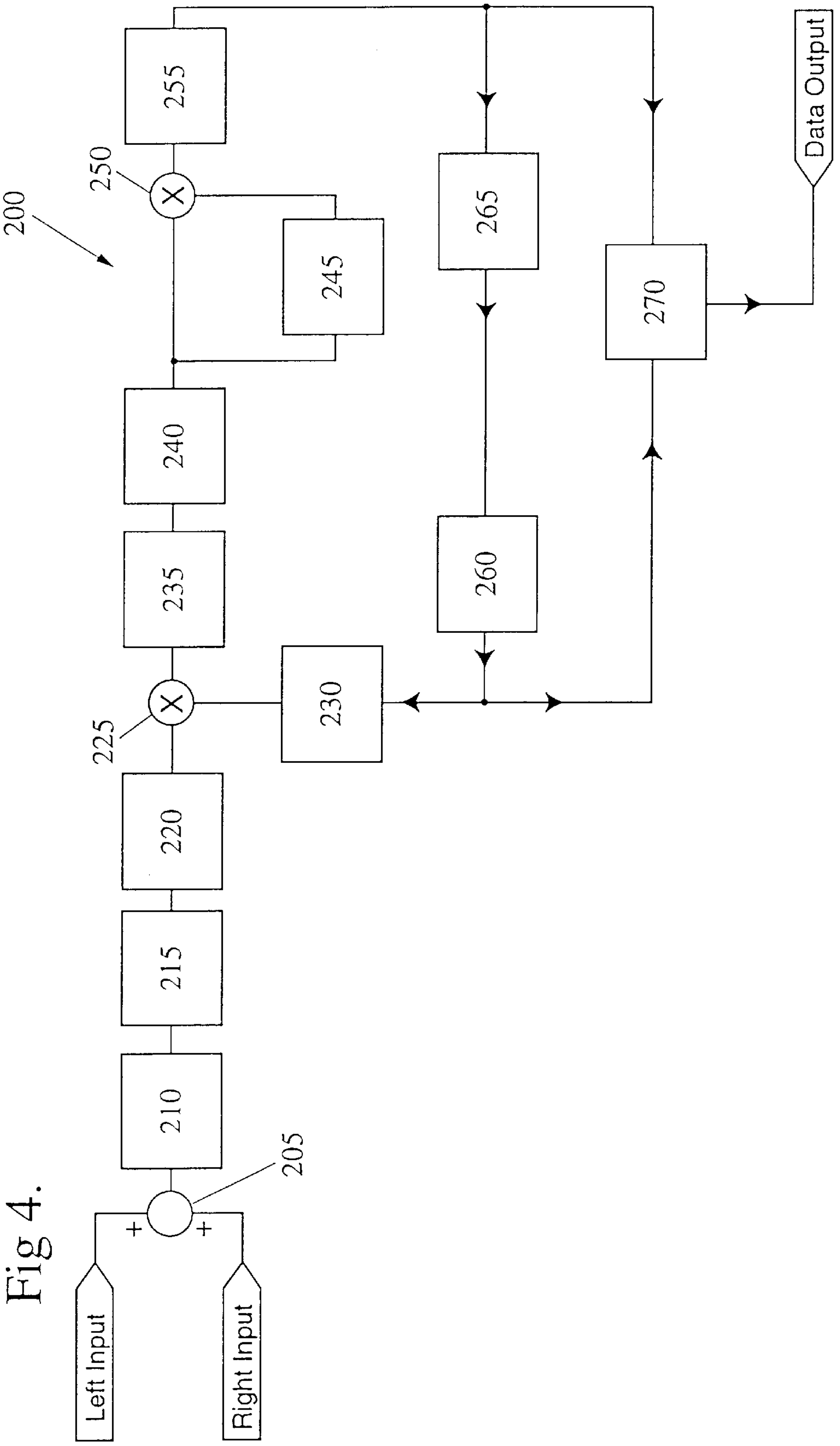
FIG. 4 is a block diagram of the decoder used in the identification stage of the method of the present invention.

The data used to tag the audio cut as described above is modulated using minimum-shift frequency shift keying. This method has the benefits of being constant envelope and has substantially lower sidelobes than other phase-modulation techniques. The data rate chosen is 100 bits per second. This requires a frequency shift of +/−25 Hz and the major lobe of the data spectrum is 150 Hz wide. To accommodate this, the decoder (described below) filter (220 in FIG. 4), has a passband 200 Hz wide and guardband extending an additional 50 Hz either side. In the encoder described above, the notch filter (made up of bandpass filter 105, delay line 110 and subtracting element 115) has a stop band 300 Hz wide (which spans the decoder filter's guardband) and a transition region extending out 200 Hz either side of 3 kHz.

Ideally, the overall transmission frequency response should extend to approximately 4 kHz. The data tag is preferably inserted at 3 kHz. This improves the inaudibility of the data signal in the audio signal since the human ear is reasonably insensitive to phase changes, particularly at higher frequencies. A balance must be found between achieving inaudibility and robustness of the data tag. Inserting the tag at higher frequencies will improve the inaudibility, but will have deleterious effects on the robustness. Inserting the data tag at 3 kHz has been found to satisfy both criteria.

At a remote location, a receiver will detect the tagged audio signal and the decoding stage begins. The received signal is received by decoder 200 shown in FIG. 4, and the left and right audio signals are combined at summer element 205. The output of summer 205 is sampled in stereo at 32 kHz but is immediately converted to mono and lowpass filtered by filter 210 which passes signals between 0 to 4 kHz to allow the sampling rate to be reduced to 8 kHz at the output of decimator 215.

The signal is then passed through FIR bandpass filter 220 (2.9–3.1 kHz) to separate the amplitude modulated MSK identification data signal (the "tag") from the rest of the audio signal. The filtered signal is then amplitude-limited to remove the envelope modulation that was applied in the encoder to mask the data. This is preferably done by multiplying the filtered signal by the inverse of the signal envelope. The resulting constant envelope MSK signal is then converted down to baseband using a quadrature 3 kHz local oscillator (made up by 100 Hz oscillator 260 and ×30 frequency multiplier 230) and mixer 225. The signal is then demodulated with a delay-line FM demodulator (10 ms delay line 245 and mixer 250).

After demodulation the signal is filtered by lowpass filter 255 to eliminate noise above 100 Hz and then passed to a lossy accumulator register and clock recovery routines (not shown). The clock recovery phase-locks a 100 Hz bit clock to the zero-crossings of the demodulated signal using zero crossing detector 265. A 3 kHz signal is derived from this clock (oscillator 260) and is used as the local oscillator for the quadrature mixer mentioned above. This ensures that the local oscillator is synchronised with the 3 kHz carrier used in the encoder.

Figure 5:
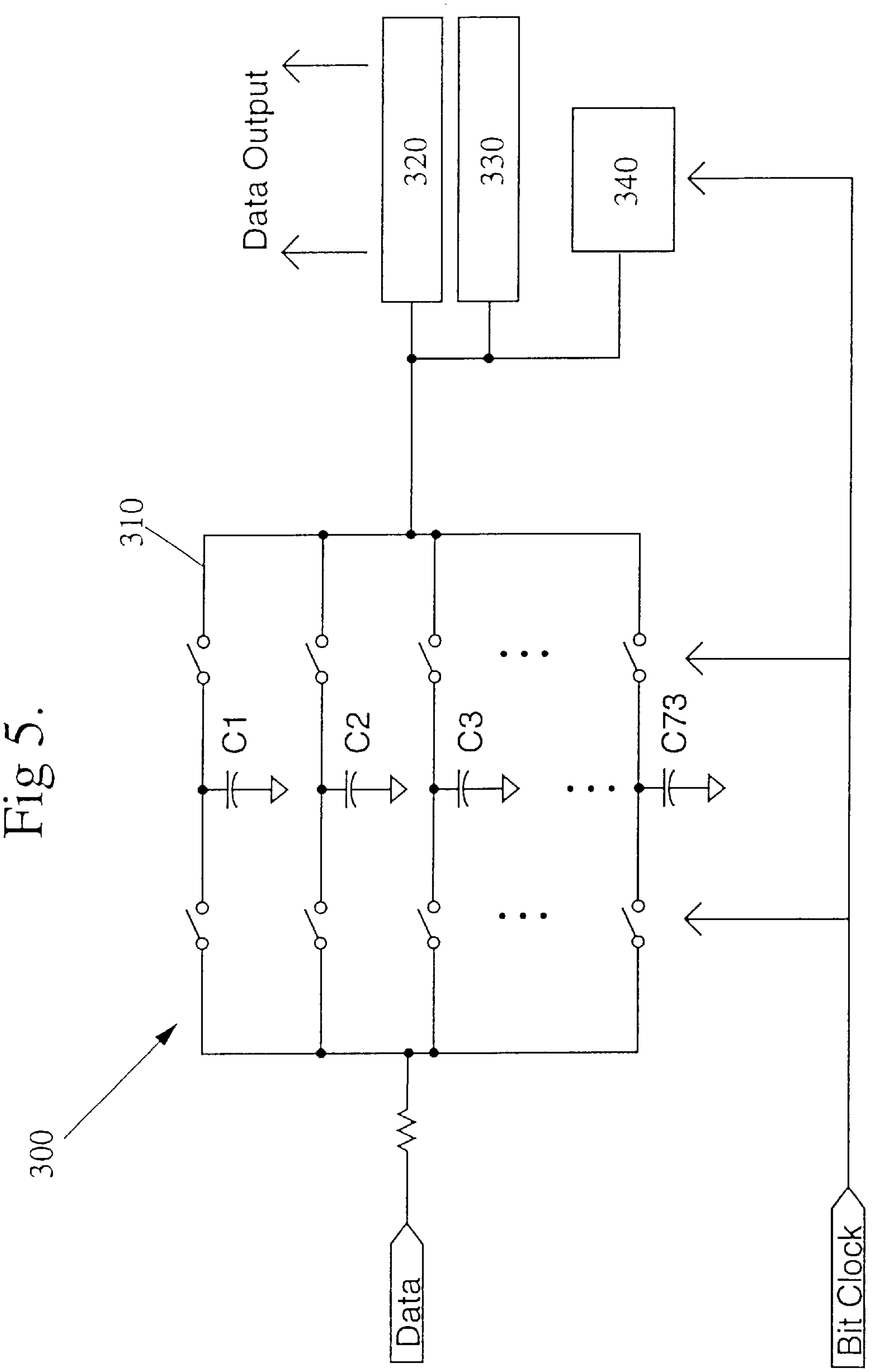
FIG. 5 is a block diagram of the bit accumulator used in the logging stage of the method of the present invention.

The demodulated signal is sampled at sampling gate 270 using the recovered bit clock, and the output of sampling gate 270 is fed into bit accumulator 300 shown in FIG. 5.

The sampled bits from the abovedescribed stage are passed sequentially to 73 lossy accumulators shown by the equivalent circuit of the bit accumulator 300, including commutating lowpass filter 310, 73-bit output shift register 320 and 32-bit CRC register 330. The commutating filter 310 averages out random noise while allowing repetitive data bits to build up. Frame synchronisation is achieved by using a signal frame sync bit which lies midway between the high and low data levels. This is detected by frame sync detector 340. The output of the commutating filter is periodically transferred to the output shift register 320 and CRC register. If the output shift register contains one and only one start bit, and if the other 72 bits pass the cyclic redundancy check, a valid frame is reported for logging.

The time constants in the clock recovery phase-locked-loop and the bit accumulator register are of the order of two seconds, providing good averaging during gaps between words while achieving reasonably fast initial acquisition.

In a practical application, at the end of a nominated period, a report of the data collected can be generated and automatically sent to a central location where the information is sorted and customised reports produced.

The retrieved data can be formatted in plain text and MS ACCESS database format. Custom reports and analysis can be written in ACCESS or VBA to perform almost any reporting function.

The device of the invention can log audio data for periods of any length (depending on configuration and model type) in a low-bandwidth (3.5 kHz) format. For example for periods of between 14 and 42 days. If additional disk storage is used, up to 180 days may be logged. An actual logged audio segment can be requested by the collecting/reporting site (CRS). The remote device then sends the low-bit rate coded audio data to the CRS for playback elsewhere. The "downloaded" audio can be played back on a suitably-equipped PC workstation.

A particular advantage of the present invention lies in the ability to actively interrogate the data logger to locate and replay a particular audio segment recorded at a particular time. For example, if one wants to hear what commercial was broadcast from station X at 1:30 am on Tuesday 9th of Mar. 1999, then these parameters can be input to the system to replay the precise audio segment transmitted at the desired time.

Presently, configuration allows up to two stations to be logged per remote Traffic Verification System (TVS). Units can be ganged together on site to enable CRS access to all remote units or a single telephone line or wireless channel.

A remote TVS unit can also be directed to change reception frequency to log an alternative station at different times of the day by using a suitable digitally controlled receiver.

The method and device of the present invention provides a means of accurately and reliably automatically identifying an audio signal by tagging the audio signal with identification data which is robust enough to survive heavy audio processing and is virtually inaudible to the ear of the listener.

In the implementation of the Traffic Verification System described above, a number of especially difficult technical problems had to be overcome.

Figure 6:
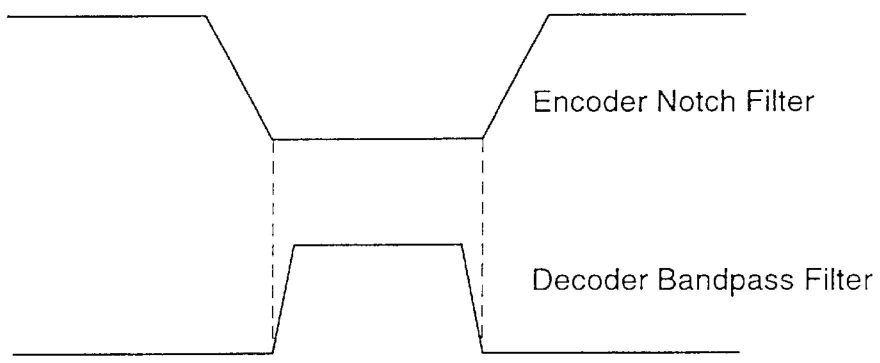
FIG. 6 shows the relationship between the frequency responses of the notch filter used in the encoder and the bandpass filter used in the decoder of the present invention.

Firstly, as described above, a tagged audio signal is received by decoder 200 which separates the data signal from the audio signal using bandpass filter 220. The passband of this filter must be wide enough to pass the major lobe of the data spectrum plus any allowance for carrier frequency offset. There will also be a small but finite transition region either side of the passband before maximum stopband attenuation is reached. To prevent audio components in the transition band from reaching the data demodulator, the bandwidth of the notch filter (made up of elements 105, 110 and 115 in FIG. 1) in the encoder 100 must extend to the edges of the stopband in the decoder as shown in FIG. 6.

To minimise the audible effect of the notch, the notch bandwidth would intuitively be as small as possible. However, since the notch bandwidth must cover the width of the stopband of the filter 220 in decoder 200, there is a lower limit imposed upon the notch bandwidth. Best results would therefore be expected to be achieved by the use of a notch filter with very steep sides, however, this was found not to be the case. A steep-sided notch filter has a relatively long impulse response which is likely to be sufficiently long to be audible as a ringing effect. Thus, a balance must be found between having a notch filter whose bandwidth is broad enough so as to minimise ringing effects, but not so broad as to become audible because of the elimination of too large a slice of audio frequency components.

It was found that the filter ringing was essentially inaudible if the width of the impulse response was kept shorter than about 20 ms.

Due to the limitations of current DSP technology, it is not possible to implement the notch filter directly as an FIR digital filter at a sampling rate of 48 kHz (and in stereo). It is therefore necessary to reduce the sampling rate (for example to 12 kHz), bandpass filter the signal, and then interpolate the signal back up to a 48 kHz sampling rate. The notch filter is completed by subtracting the bandpass filtered signal from the original signal delayed by an amount equal to the group delay of the combined bandpass filter and sampling rate conversion filters.

Another technical problem that had to be overcome was in the envelope remodulation for modulating the MSK data signal.

The output of the bandpass filter 105 in the encoder 100 appears in the time domain as an amplitude modulated carrier. Envelope detector 120 is used to extract the amplitude modulation component and this is used to modulate the MSK data signal prior to reinsertion into the audio as described above. Closer examination of the output of the filter reveals, however, that whenever the envelope goes through zero there is a 180 degree phase reversal in the "carrier". Because this phase reversal is not carried across onto the remodulated data signal, the bandwidth of that signal is substantially wider than the original signal.

This can be a problem for two reasons. Firstly, the additional AM sidebands extend beyond the edges of the decoder's filter 220 and can produce incidental phase modulation of the data signal. Secondly, there is a concern that this wider bandwidth could produce audible artefacts in the encoder output.

In early testing, the first problem was found to cause quite severe degradation of the recovered data signal, and to alleviate this a lowpass filter was inserted between the envelope detector and the remodulator. For good results it was found to be necessary to have the bandwidth of this filter less than half the width of decoder's bandpass filter 220. However, such a narrow filter on the envelope modulation caused the data signal to spread in the time domain which made it very audible. Again, it was found that having little or no filtering on the envelope of the data signal minimised its audibility.

At first this appeared to be an intractable problem. The interference to the demodulated data could be reduced by widening the demodulator filter, but this would mean also widening the encoder's notch filter which in itself would broaden the sidebands on the remodulated data.

Figure 7:
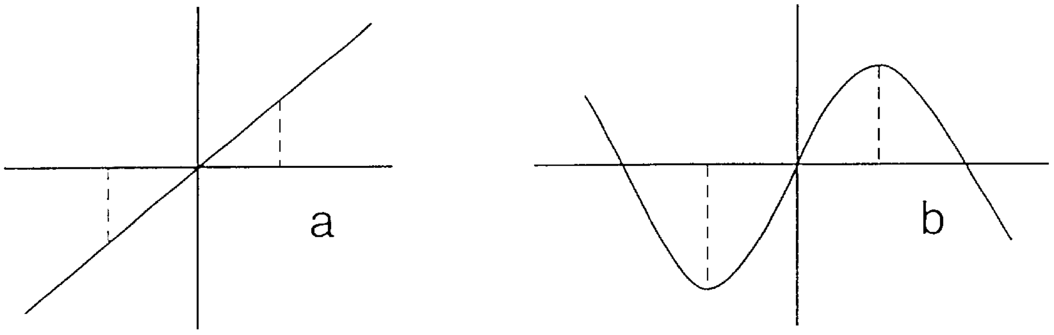
FIG. 7*a* shows a voltage versus frequency characteristic of a traditional MSK demodulator.
FIG. 7*b* shows a voltage versus frequency characteristic of an MSK demodulator used in the present invention.

Attention was then turned to the data demodulator. Initially a traditional FM demodulator was used, which has an output versus frequency characteristic as shown in FIG. 7*a*. The effect of the incidental phase modulation caused by the additional envelope sidebands is to add high frequency noise which, from the characteristics of the demodulator, produces a large noise output.

An alternative demodulator is the delay line detector, whereby the MSK signal is multiplied by itself delayed by one bit period. The output of this detector has a voltage versus frequency characteristic shown in FIG. 7*b*. The frequencies corresponding to the two data levels coincide with the positive and negative peaks of the transfer characteristic, and any high frequency noise will produce an output no larger than this, and on average the noise will be substantially lower than the recovered data. Further improvement is achieved by following the demodulator with a low pass filter.

Use of the delay line demodulator allowed the encoder's remodulator to operate without filtering and resulted in minimum audibility of the data while achieving reliable data recovery in the decoder.

A further technical problem involved the carrier recovery. The data decoder 200 requires the generation of a 3 kHz carrier in order to translate the data signal back down to baseband. While this carrier does not have to be synchronous with the encoder 100, the amount of frequency error that can be reasonably tolerated is small, preferably less than about 5 Hz. In systems where the tagged audio is stored on hard disk this is not a problem as frequency accuracy will be several orders of magnitude better than this. However, if tape storage is used, either as the final replay medium or for intermediate transfer, frequency errors substantially larger than this could be expected.

There are several MSK demodulation schemes found in the literature that use phase locked loops to track such carrier errors, however these all require a loop bandwidth that is much smaller than the data rate. In the case of TVS, the data rate is only 100 bits per second, so loop bandwidths of the order of a few Hertz at most would be needed. This presents a problem as the capture range of a phase locked loop is related closely to its loop bandwidth, so such a demodulator would have difficulty in capturing a signal that was say 10 or 15 Hz off frequency.

A solution to this problem was found when it was realised that in the encoded signal the carrier frequency is always exactly 30 times the bit rate, regardless of any tape speed variations. It was then a simple matter to implement a phase locked loop locked to the bit clock that is recovered from the zero-crossing of the demodulator output to provide automatic tracking of the carrier frequency.

The occurrence of periods of silence in an audio program also caused some problems. Because the amplitude of the data signal is equal to the amplitude of the audio that was notched out of the original signal, if there is a period of silence in the original audio no data will be present either.

Most radio and television commercials have a music bed behind the spoken words, and in this case there is no problem. However, there are still many commercials that consist only of speech with pauses between words and sentences. Some commercials even have deliberately long periods of silence in them.

This is a problem because the bit rate used of 100 bits per second and a frame length of 72 bits takes almost a full second to send a complete frame. This means that almost two seconds of continuous audio would be required to ensure that a complete frame was received, and there may well be commercials in which this requirement is not met.

With TVS the same data frame is sent repeatedly during each commercial, so the possibility of using this redundancy was explored. The answer was found in the software equivalent of a flywheel synchronised to the data frames. By having 72 separate "bit bins" rotating past the demodulator output, each bin will build up when the data signal is present at that instant, and will slowly decay when it is absent. In this way bursts and gaps in the data are averaged out over the entire length of the commercial, resulting in good data recovery even when there are many pauses in the audio.

Having successfully recovered the 72 bit frame from the encoded data, the final problem is to find where in those 72 bits the frame actually starts. The use of a 32 bit cyclic redundancy check (CRC) provides an extremely high degree of immunity to erroneous decoding, but only if frame synchronisation is established.

Various schemes were considered, including the use of a unique header bit pattern such as the flag in HDLC-type packet formats, but the overhead requirements in terms of extra bits for the header itself and any bit stuffing in the data to ensure uniqueness made this approach prohibitive.

Some other modulation schemes (such as Manchester encoding) make use of an illegal transition as a frame marker, and it was decided to do a similar thing here. An extra bit was added to the frame and this was set midway between the levels representing zero and one. In terms of the MSK modulator, this is equivalent to the carrier frequency without an offset.

To detect frame synchronisation, the bit bins (of which there are now 73) are scanned sequentially. If there is one and only one bit at this intermediate level it is taken as the start bit and a CRC check is done on the rest of the frame. If the CRC is valid the decoded data is then logged.

In the particular application of the present invention to television broadcasts, a further problem must be considered. This is the synchronisation between the video signal and the audio signal to maintain lip-sync. As the audio signal is processed, it passes through several processing blocks. Each block contributes to an overall delay in the audio signal, causing it to lose synchronisation with the video signal. This problem is addressed by simply minimising the delays of various blocks within the system between input and output. This may be done by various methods as would be known to the person skilled in the art. It has been found that an acceptable delay is in the order of 10 milliseconds. Such a delay is not readily perceived by the viewer.

Although the invention has been described in the context of television or radio broadcasts, it will be understood that the invention is equally applicable to any area where an identification or authentication of an audio signal is required. For example, where an audio signal is used to transmit control instructions, the receiver can determine whether the audio signal received is authentic or authorised before carrying out those instructions. In this case, the audio signal may be tagged with an authorisation data signal. Such a system may be useful in military and/or aviation applications.

The present invention could also be applied to other audio signal applications, for example, recording, where simple identification is of benefit. In the case of applying the tag to audio recordings for compact disks for example, where sound quality is all important, the quality may be preserved by processing the signal to insert the tag in the purely digital domain. In this case, there is no analog to digital conversion and visa versa. The audio signal is input as a digital signal, processed digitally to insert the tag, and output as a tagged digital signal.

What is claimed is:

1. A method of inserting a data signal into an audio signal to provide a tagged signal, said method including the steps of:

A. removing a band of frequencies centred at a predetermined notch frequency from said audio signal;

B. spectrally shaping said data signal such that it takes on the precise shape and magnitude of the envelope of the audio signal at said removed band of frequencies centred at said notch frequency; and C. inserting said shaped data signal into said audio signal within the removed band centred at said notch frequency.

2. A method according to claim 1 wherein said data signal comprises a carrier signal modulated to encode data using minimum shift frequency shift keying (MSK).

3. A method according to claim 1 wherein said notch frequency is approximately 3 kHz.

4. A method according to claim 3 wherein said data signal is present over substantially the entire time span of an audio segment comprising the audio signal.

5. A method according to claim 3 wherein said data encoded on said data signal includes two six-digit numbers.

6. A method according to claim 5 wherein said two six-digit numbers are presented in binary form as a 40 bit field.

7. A method according to claim 6 wherein a 32-bit cyclic redundancy check code is added to said 40-bit field.

8. A method according to claim 7 wherein an additional frame synchronisation pulse one bit period in length is added.

9. A method according to claim 3 wherein said band of frequencies is approximately 400 Hz wide.

10. A method according to claim 5 wherein said two six-digit numbers comprise identification information to identify said audio signal.

11. A method according to claim 1 wherein said data signal is a control signal.

12. A method of detecting a data signal within an audio signal, said audio signal including said data signal inserted into said audio signal at a predetermined band of frequencies, and spectrally shaped so as to conform precisely with the envelope of said audio signal at said predetermined band of frequencies, said method including the steps of:

A. receiving said audio signal at a receiving station;

B. band pass filtering said received signal to extract said inserted data signal; and C. removing amplitude modulation resulting from the spectral shaping from said extracted data signal.

13. A method of detecting a data signal inserted into an audio signal, said audio signal including said data signal inserted into said audio signal at a predetermined band of frequencies, and spectrally shaped so as to conform precisely with the envelope of said audio signal at said predetermined band of frequencies, said data signal including a carrier signal being MSK modulated, said method including the steps of:

A. receiving said audio signal at a receiving station;

B. band pass filtering said received signal to extract said inserted modulated data signal;

C. removing the amplitude modulation resulting from the spectral shaping from said modulated data signal; and D. frequency demodulating said modulated data signal.

14. A method according to claim 12 wherein said received signal is lowpass filtered before being bandpass filtered.

15. A method according to claim 1 wherein after step B, said modulated data signal is down converted to baseband.

16. A method according to claim 12 wherein said step of removing said amplitude modulation is achieved by amplitude limiting said modulated data signal.

17. A method of tagging for identification an audio signal, said method including the steps of:

A. removing a band of frequencies centred at a predetermined notch frequency from said audio signal;

B. spectrally shaping an identification signal identifying a particular audio segment such that it takes on the precise shape and magnitude of the envelope of the audio signal at said removed band of frequencies centred at said notch frequency;

C. inserting said identification signal into said audio signal to produce a tagged signal;

D. transmitting said tagged signal;

E. receiving said transmitted tagged signal;

F. bandpass filtering said received tagged signal to extract said identification signal;

G. removing the amplitude modulation resulting from the spectral shaping from said extracted identification signal; and H. reading and/or recording said identification signal to identify said tagged signal.

18. A method according to claim 17 wherein between step A and step B, said identification signal is formed by modulating a carrier signal to encode identification information using minimum shift frequency shift keying (MSK), and between steps G and H, said signal is frequency demodulated.

19. A method according to claim 17 wherein the step of removing said amplitude modulation is achieved by amplitude limiting said extracted identification signal.

20. A method according to claim 17 wherein said notch frequency is approximately 3 kHz.

21. An encoder for encoding a data signal onto an audio signal, said encoder including:

a filter for removing a band of frequencies centred at a predetermined notch frequency from said audio signal;

shaping means for spectrally shaping said data signal such that it takes on the precise shape and magnitude of the envelope of the audio signal at said removed band of frequencies;

inserting means for inserting said shaped data signal into said audio signal within the removed frequency band centred at said notch frequency; and data input means for receiving data to be encoded into said audio signal.

22. An encoder according to claim 21 wherein said filter means includes a first input element for receiving said audio signal:

a bandpass filter connected to said input element for passing a band of frequencies of said audio signal centred at said notch frequency;

a delay element connected to said input element for delaying said audio signal; and a difference element for subtracting the output of said bandpass filter from the output of said delay element.

23. An encoder according to claim 22 wherein said shaping means includes:

an enveolpe detector connected to the output of said bandpass filter; and an amplitude modulator having a first input connected to the output of the envelope detector, and a second input connected to said data input means.

24. An encoder according to claim 23 wherein said inserting means includes a summer having a first input connected to the output of said difference element and a second input connected to the output of said amplitude modulator for producing an encoded audio signal.

25. An encoder according to claim 23, wherein said envelope detector is a square law detector.

26. An encoder according to claim 24 wherein said encoder further includes a delay element connected between the output of said difference element and the input of said summer.

27. An encoder according to claim 24 wherein a minimum shift frequency shift keying (MSK) modulator is inserted between the data input means and the second input of said amplitude molulator.

28. An encoder according to claim 22, wherein said bandpass filter has a bandwidth of approximately 400 Hz and is centred at approximately 3 kHz.

29. An encoder according to claim 27 wherein said MSK modulator is centred at approximately 3 kHz.

30. A decoder for decoding an encoded audio signal encoded by inserting within a predetermined band of frequencies a data signal which is spectrally shaped to conform with the precise shape of the envelope of the audio signal at said predetermined band of frequencies, said decoder including:

a receiver input for receiving said encoded audio signal;

a receiver filter for extracting a band of frequencies containing said code from said encoded audio signal;

means for removing an envelope modulation applied to said data signal; and a receiver demodulator for demodulating said data signal.

31. A decoder according to claim 30 wherein said means for removing said envelope modulation is an amplitude limiter.

32. A decoder according to claim 30 wherein said receiver demodulator is a delay-line FM demodulator.

33. A decoder according to claim 32 wherein a lowpass filter is inserted between the receiver input and said receiver filter.

34. A decoder according to claim 32 wherein said receiver filter has a bandwidth of approximately 200 Hz centred at approximately 3 kHz.

35. A method according to claim 2 wherein said notch frequency is approximately 3 kHz.

36. A method according to claim 13 wherein said received signal is lowpass filtered before being bandpass filtered.

37. A method according to claim 13 wherein said step of removing said amplitude modulation is achieved by amplitude limiting said modulated data signal.

38. A method according to claim 18 wherein said notch frequency is approximately 3 kHz.

* * * * *